United States Patent [19]

Middleman et al.

[11] 4,379,220
[45] Apr. 5, 1983

[54] METHOD OF HEATING LIQUID

[75] Inventors: Lee M. Middleman, Portola Valley, Calif.; Roger S. Goodrich, Smyrna, Ga.

[73] Assignee: Raychem Corporation, Menlo Park, Calif.

[21] Appl. No.: 218,445

[22] Filed: Dec. 19, 1980

Related U.S. Application Data

[62] Division of Ser. No. 38,218, May 11, 1979, Pat. No. 4,276,466.

[51] Int. Cl.³ .......................... F24H 1/06; H05B 3/04
[52] U.S. Cl. ........................................ 219/331; 119/5; 219/510; 219/523; 337/120; 338/22 R; 432/1
[58] Field of Search ............... 219/316, 331, 336, 403, 219/437, 510, 513, 523, 528, 530, 540, 541, 543, 219/544, 552, 553; 338/122 R, 22 SD, 31, 212, 213, 338/229; 119/5, 37; 337/120; 13/34; 432/24, 23, 29, 432/1, 60

[56] References Cited

U.S. PATENT DOCUMENTS

| 3,313,921 | 4/1967 | Mohn et al. ............... 338/229 X |
| 3,462,724 | 8/1969 | Jackson ..................... 338/229 |
| 3,748,439 | 7/1973 | Ting et al. .................. 219/523 |
| 3,803,386 | 4/1974 | Rodrigues .................. 219/523 |
| 4,021,643 | 5/1977 | Hall et al. .................. 219/523 |
| 4,074,222 | 2/1978 | Kiyokawa et al. ......... 219/528 X |
| 4,177,375 | 12/1979 | Maixner ..................... 219/441 |
| 4,177,376 | 12/1979 | Horsma et al. ............. 219/553 |

FOREIGN PATENT DOCUMENTS 376053 7/1932 United Kingdom ............... 219/523

Primary Examiner—Volodymyr Y. Mayewsky
Attorney, Agent, or Firm—Lyon & Lyon

[57] ABSTRACT

A heater for heating liquids such as water in an aquarium comprises a water-impermeable housing including a heating section for immersion in the water. Within the heating section of the housing is a flexible, distributed planar heating element. The housing is resistant to breakage from mechanical and operating abuse and has a high heat transfer coefficient and high heat distortion temperature. To prevent the housing from melting when a control element of the heater malfunctions, preferably the aquarium heater includes temperature limiting means such as a circuit protection element comprising a material having a positive temperature coefficient of resistance. Preferably, the heating section of the housing is fabricated with large surface area walls to accommodate the planar heating element, and is provided with coupling means for maintaining the heating element thermally coupled to the walls of the heating section. The coupling means can be a ribbed support for holding the heating element against the heating section walls.

42 Claims, 5 Drawing Figures

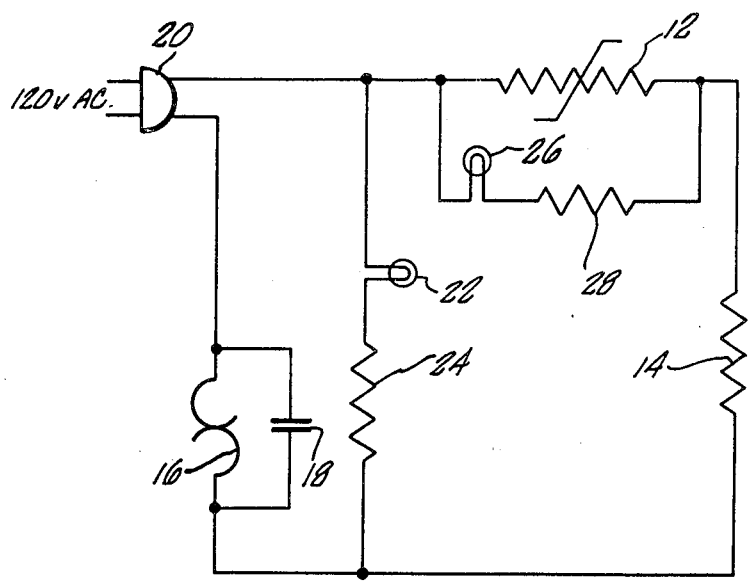
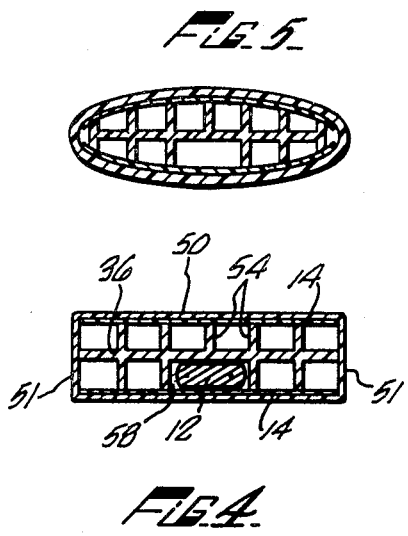
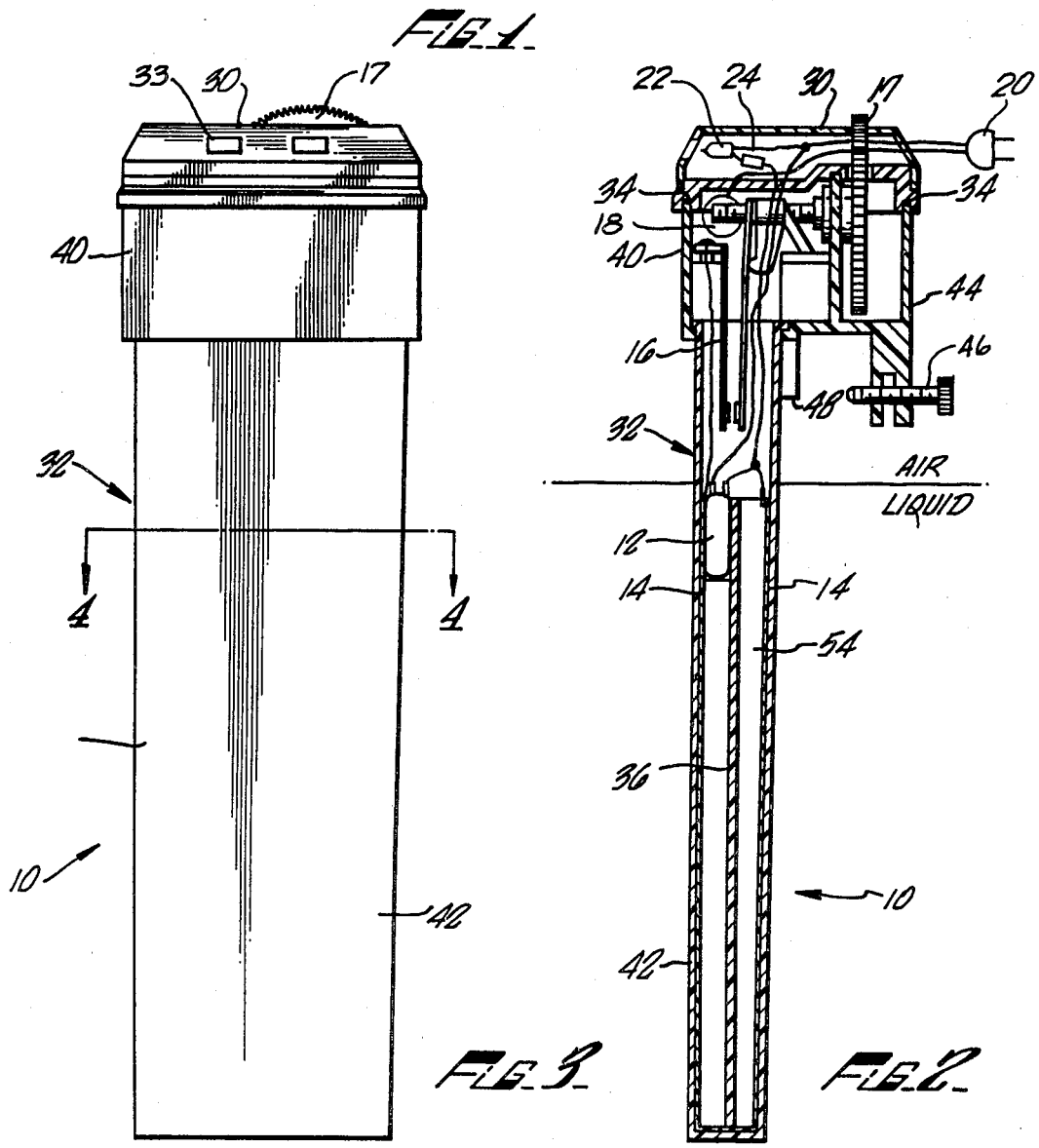

METHOD OF HEATING LIQUID

This is a division of application Ser. No. 038,218, filed May 11, 1979, now U.S. Pat. No. 4,276,466.

BACKGROUND OF THE INVENTION

This invention relates to heaters for liquids, and particularly aquarium heaters.

Aquarium heaters conventionally comprise wire-wound heating elements such as resistance heating wires wound about a hollow ceramic core. The heating element is in series with a bi-metal thermostat which is set by means of a knob to open when the temperature of the air around the thermostat exceeds a selected temperature in the range of typically 25° to 45° C. The heating element is housed in a cylindrical glass container, such as a test tube.

Although these aquarium heaters are the standard of the industry, they often malfunction in use. In particular, the glass housing is relatively fragile and can develop cracks. Mechanical abuse can cause cracks or fractures in the housing. A cracked housing can also result from operational abuse, such as operating the heater with a low water level in the aquarium, and then filling the aquarium with cold water, thereby thermally shocking the glass. Because water can then leak into the housing, current leakage can occur, which can result in electrocution of fish in the aquarium, and sometimes even a shock to an ichthyologist.

Another problem with conventional aquarium heaters is that the bi-metal thermostat can malfunction, usually in the closed mode or can by human error be set in the fully closed mode. If this occurs, the fish can be killed.

Another form of operational abuse that occurs is operation of the aquarium heater when it is not immersed in water, such as when the heater is removed from the aquarium for cleaning of the aquarium. The heater can then be a source of fire because the heater can get much hotter in air than in water. In addition, if the hot heater is immersed in water, breakage of the glass housing can occur, with excessive leakage current resulting.

In response to these problems with electric heaters for aquariums, Underwriters Laboratories, Inc. recently promulgated UL 1018 standard regarding electric aquarium equipment. This standard, which took effect on Jan. 1, 1979, requires for UL approval that in normal operation, aquarium heaters have a leakage of current which does not exceed 0.5 milliamperes. Under abnormal use, a heater is required to: (1) be able to be dropped three times from a height of three feet off a hardwood surface; (2) be suspended from a three foot length of flexible cord and released so that it swings by the cord against a vertical wall of hardwood; and (3) be able to take a crushing force using a 12-inch square flat steel plate with a crushing load of 100 lbs. force. In spite of such abuse, the heater is required to remain intact with a leakage current of no more than 0.5 milliamperes. Aquarium heaters with a glass housing cannot pass these mechanical abuse tests.

There are other UL tests that heaters with glass enclosures cannot satisfy. For example, an immersible heater with its control set for maximum heating is required to be able to operate in free air until it is well heated and then dipped suddenly into water at room temperature. The aquarium heater is required to undergo this test five times, and still exhibit no dielectric breakdown, demonstrate no adverse mechanical or operational effects, and have no increased likelihood of fire, electric shock or injury to a person.

Another UL test that conventional heaters cannot pass is the fire test. In this test, the heater is placed on a softwood board. The heater is covered with cheesecloth, set to maximum heat, and operated for 7 hours. No glowing or flaming of the cheesecloth or tissue paper is permitted.

It is evident that there is a need for an immersible heater suitable for use in aquariums, where the heater performs satisfactorily, not only in normal operation, but also when subjected to misuse and abuse in ordinary and extraordinary operation.

SUMMARY

The present invention is directed to an immersible heater suitable for liquids, and particularly water, with these features. A particular feature of the heater is that its housing is not formed of glass, but rather comprises a strong, highly heat conductive, heat resistant material having a notched Izod impact strength of at least about 0.5 ft-lbs/in, a heat transfer coefficient of at least about 2 BTU-inches per hour-square foot-°F., and a heat distortion temperature at 264 PSI of at least about 350° F. Preferably, the housing is also electrically insulating. The preferred material is filled polyphenylene sulfide. Polyphenylene sulfide is sufficiently strong that a housing made of it can suffer a great amount of mechanical abuse, and still maintain its structural and electrical integrity. However, replacing the glass housing of a conventional aquarium heater with a polyphenylene sulfide housing does not by itself yield a satisfactory aquarium heater. This is because a housing made of polyphenylene sulfide can be melted by the hot resistance heating wire of a heating element, particularly if the bi-metal thermostat of the aquarium heater malfunctions in a closed mode.

Therefore, the heater of the present invention has as its heating element a distributed area heating element capable of providing a maximum of about 10 watts per square inch of surface area, and preferably at least about 1 watt per square inch of surface area. Because of this low energy density, it is not possible to melt the housing during normal operation when the housing is immersed in water. To prevent melting of the housing if the bi-metal thermostat malfunctions or by error is set in a fully closed position and the housing is not immersed in water, preferably the heater includes temperature limiting means such as a circuit protection element comprising at least two electrodes and a PTC element (Positive Temperature Coefficient of resistance element; described below) composed of a PTC composition. The circuit protection element is selected and positioned so that it is capable of preventing the heating element from heating the housing to a temperature at which the housing melts. Instead of or in addition to using a circuit protection element, the heating element can comprise a PTC composition that serves as the temperature limiting means.

Because of the low energy density of the heating element, preferably the housing provides a large heat transfer area and preferably the heating element is thermally coupled to the walls of the housing. A preferred large surface area housing comprises a hollow, thin, elongated heating section, the heating section being oval in cross section. Preferred means for thermally coupling the heating element to the housing comprises a support for maintaining the heating element against the internal surface of both of the wider side walls.

DRAWINGS

These and other features, aspects and advantages of the present invention will become better understood with reference to the following description, appended claims, and accompanying drawings where:

FIG. 1 is a circuit diagram of an aquarium heater according to the present invention;

FIG. 2 is a longitudinal cross-sectional view of an aquarium heater according to the present invention and having a circuit as shown in FIG. 1;

FIG. 3 is a front elevation view of the aquarium heater of FIG. 2;

FIG. 4 is a cross-sectional view of the heater of FIG. 3 taken on line 4—4 in FIG. 3; and FIG. 5 is a cross-sectional view similar to that of FIG. 4 of another heater according to the present invention.

DESCRIPTION

The present invention is directed to immersible heaters for liquids, where the heater can resist mechanical and operational abuse. The heaters described herein and shown in the figures are suitable for heating water in aquariums. The heaters are also useful for heating liquids other than aquarium water, such as photographic developing solutions.

FIG. 1 shows a circuit diagram for an aquarium heater 10 of the present invention and FIG. 2 shows a cross-sectional view of an aquarium heater of the present invention. Referring to these figures, temperature limiting means such as a circuit protection device 12 is connected in series with a heating element 14 and means for regulating the heating element for controlling the aquarium water temperature. The regulating means can be a bi-metal thermostat 16 which is set by means of a knurled knob 17 to open when the temperature of the air around it exceeds a temperature in the range of 25° to 45° C. A capacitor 18 is connected in parallel with the thermostat 16. A plug 20 enables the heater 10 to be connected to a 120 volt AC power supply (not shown). A neon lamp 22 and a current limiting resistor 24 are connected in parallel with the heating element 14 and the circuit protection device 12, so that the lamp 22 is lit when AC power is supplied via the plug 20 and the thermostat 16 is closed. A second neon lamp 26 (not visible in FIG. 2) and a resistor 28 (not visible in FIG. 2) are connected in parallel with the circuit protection device 12 so that the lamp 26 is lit when the device is activated, but not when the aquarium heater 10 is in a normal operating mode. These components are secured to a molded plastic cap 30 which is attached to a housing 32. A gasket 34 provides a water tight seal between the cap 30 and the housing 32.

In a preferred circuit of the present invention, the capacitor 18 is 0.01 microfarad, the resistors 24 and 28 are 220 kilohms, and the neon lamps 22 and 26 are model numbers NE-2KR20 available from General Electric. The heating element 14 is typically 50, 75, or 100 watts. Both neon lamps are mounted under water tight, translucent covers 33. The NE-2KR20 light available from General Electric includes in one component both the neon light and the 220 kilohms resistor.

The circuit shown in FIG. 1 is comparable to the circuit shown in FIG. 8 of co-assigned U.S. patent application Ser. No. 965,344 filed on Dec. 1, 1978 by Middleman, et al, which is incorporated herein by reference. The heater 10 of the present invention differs from the aquarium heater described in the '344 application in the type of heating element 14 used, and the shape, size, and operational characteristics of the housing 32. The heating element of the '344 application is a conventional, high temperature wire-wound heating element comprising resistance heating wires wound about a hollow ceramic core, while the heating element 14 of the heater 10 of the present invention is a low energy density, distributed heater, as described in detail below. The housing of the heater described in the '344 application is a conventional small surface area, test tube shaped housing, while the housing 32 of the heating element 14 has a large surface area configuration.

Another important difference between the heater 10 of the present invention and that described in the '344 application is that the heating element 14 of the present invention is thermally coupled to the walls of the housing. A large surface area housing and thermal coupling are needed because of the low energy density and relatively low temperatures of the heating element 14. By "thermal coupling", there is meant that the resistance to heat transfer from the heating element 14 to the housing 32 is minimized and is less than the resistance provided by the air gap between the glass housing and the wire-wound heating element of conventional aquarium heaters. Such thermal coupling can be provided by coupling means such as a heat transfer fluid such as silicone oil between the housing and the heating element, or preferably by maintaining the heating element in intimate engagement with the housing. As shown in FIG. 2, the preferred coupling means is a support core member 36 which serves to maintain the heating element 14 against the internal surface of the housing 32.

The housing and cap preferably are fabricated of the same material for ease in securing them together and for convenience in molding. It is a sine qua non of the present invention that the housing is able to remain intact in spite of substantial mechanical abuse, including the abuse specified in the above-described tests of Underwriters Laboratories. The housing must be fabricated of a material having a notched Izod impact strength of at least about 0.5 ft-lbs/in. As used herein, the notched Izod impact strength of a material is determined according to ASTM test method D256. It has been determined that materials with such a high impact strength are satisfactory for aquarium heater housings. It should be noted that glass does not meet this impact strength requirement.

It is also desirable that the housing resist melting at elevated temperatures which can result from operational abuse, i.e., operating the heater 10 when it is not immersed in water or only partially immersed in water. Therefore, it is preferred that the material used to form the housing has a heat deflection temperature at 264 psi of at least about 350° F., and preferably at least about 500° F. As used herein, heat deflection temperature is that temperature measured according to ASTM testing method D648.

It is desirable that the housing be able to rapidly transfer heat from the heating element to the surrounding medium, both for efficient utilization of electricity and to avoid excessive heating of the housing. For rapid and efficient heat transfer to the surrounding medium, it is preferred that the housing be formed of a material having a thermal conductivity of at least about 1.5

BTU-inches per hour-square foot-°F., and more preferably at least about 2 BTU-inches per hour-square foot-°F.

Preferably, the housing is made of a material that is electrically insulating, i.e., substantially electrically non-conductive, to avoid current leakage into the water of an aquarium. In addition, preferably the housing is formed of material that is not chemically degraded or dissolved by solvents, and of course, not adversely affected by water. For ease in fabrication of the housing, preferably the housing is made of a material that is capable of being injection molded.

There is no available material which is perfect, especially when cost is considered. Materials considered suitable for the housing include polypropylene, phenylene oxides, phenylene sulfides, polysulfones, polyether ketones, and polyether sulfones, all with and without fillers. Talc is not a satisfactory filler because it absorbs water. Corrosion resistant metallic housings can, in some instances, be suitable, although metallic housings are not electrically insulating. Upon consideration of molding characteristics, cost, mechanical properties, electrical properties, and thermal properties, the preferred material for the housing is glass filled phenylene sulfides such as those marketed by Phillips Chemical Company under the trade names Ryton R-8 and Ryton R-10. These materials can have a notched Izod impact strength of at least 0.5 ft-lbs/in., a heat deflection temperature at 264 psi in excess of 500° F., and heat transfer coefficient in excess of 2 BTU-inches per hour-square foot-°F. Another advantage of polyphenylene sulfide is that it is relatively inflammable, having a UL 94 flammability rating of V-0. Both Ryton R-8 and R-10 are polyphenylene sulfide resins filled with mineral and glass materials.

However, even a housing 32 composed of polyphenylene sulfide can melt if subjected to operational abuse such as operation of the heater 10 in air with the thermostat 16 set at an elevated temperature, or if the thermostat malfunctions in a closed mode. Such melting, of course, would not occur with a glass housing. To avoid this melting, the heater 10 includes one or more temperature limiting means. The temperature limiting means is different from the temperature regulating means. The temperature regulating means is the primary control device that can be manually operated by the owner of the heater to maintain the aquarium water at a desired temperature. The temperature limiting means is a back up safety element that usually is not manually operated by the owner and that prevents the heating element from becoming hotter than a desired temperature. The temperature limiting means can be no more than a wax pellet which melts at selected temperature below the melting point of the housing, or it can be a backup bi-metal thermostat. Alternatively, the heating element can comprise a PTC composition with a sufficiently low switch temperature $T_s$ (i.e., the temperature at which the resistance of the PTC composition commences to increases sharply) that the heating element cannot get so hot that it can cause the housing to melt or soften. In this version of the present invention, there need not be a separate temperature limiting means, but rather the temperature limiting means is built right into the heating element. Suitable heaters having a built-in temperature limiting means are described in co-assigned U.S. Pat. No. 4,177,376, issued to Horsma, et al., which is incorporated herein by this reference.

The preferred temperature limiting means is the circuit protection element or device described in the aforementioned application Ser. No. 965,344. This device is preferred because it is infinitely reversable, i.e., even if the device is tripped by excessively high temperatures, once the heater cools down, the device switches back to an inactive mode and allows the heater to continue to heat aquarium water. Such a circuit protection device comprises at least two electrodes and a PTC element composed of a PTC composition. As described in application Ser. No. 965,344, this type of circuit protection device generally comprises an electrically insulating jacket which surrounds the PTC element and the electrodes and through which pass the leads to the electrodes.

The most preferred circuit protection device is a PolySwitch ™ thermal limit device model No. TLD-01-AA150W sold by Raychem Corporation of Menlo Park, California. Such a device demonstrates a sharp increase of dR/dT (change in resistance with change of temperature) at about 75° C. The resistance of a TLD-01-AA150W device at 50° C. is about 0.2 ohm, at 75° C., it is about 1 ohm, at 100° C. it is about 15 ohms, and at 125° C. it is about 200,000 ohms. A TLD-01-AA150W device has a maximum pass current at 75° F. inactivated of 2 amps, a maximum allowance in rush current at 120 V of 10 amps, a residual current when activated (at 120 V, in still air) of 0.02 amp, and a temperature after activation of 260° F. Filed herewith is a Citation of Art to which is attached a data sheet for PolySwitch ™ thermal limit devices. This data sheet is incorporated herein by this reference.

Even if the heater 10 is provided with a circuit protection device, a housing 32 could still fail by melting if a conventional heating element comprising resistance heating wires wound about a hollow ceramic core is used because the wire has a small surface area and gets very hot to deliver the necessary BTU's. To overcome this problem, according to the present invention, the heating element 14 is a distributed heater that provides no more than about 10 watts per square inch of surface area. As used herein, when a wattage value per square inch is given for a heating element, the basis is the surface area of the heating element, i.e., the heating element 14 produces no more than 10 watts per square inch surface area of the heating element 14. With such a low energy density, there is no danger of the housing 32 failing by melting when the heater is in water, particularly when it is composed of polyphenylene sulfide. Because of the temperature limiting means and use of the distributed heating elements, even if the heater is operated in air, the housing cannot melt or soften.

There is another reason that it is important that the heating element produce no more than about 10 watts per square inch. If the heating element produces more than 10 watts per square inch, there can be insufficient time for the circuit protection device 12 to respond to overheating. This problem can be overcome by using a highly sensitive circuit protection device. However, this would create the problem of nuisance tripping.

To avoid an uneconomically large and inconveniently bulky heater 10, the heating element 14 has an energy output of at least about 1 watt per square inch, preferably an energy output from about 3 to about 7 watts per square inch, and most preferably, an energy output of about 5 watts per square inch. Preferably the heating element is sufficiently flexible so that it can conform to the configuration of the interior surface of the hollow housing 32 so that it can be thermally coupled to the housing.

Exemplary of heating elements having a sufficiently low energy density are conductive polymeric heaters, including temperature self-limiting conductive polymeric heaters; mesh metal heaters with a busbar at parallel edges; and thin film evaporative heaters formed by evaporating metal on a plastic substrate. A preferred heating element is one which comprises an electrically conductive film sandwiched between two sheets of electrically insulating material, where the electrically conductive film comprises a conductive material dispersed in a non-conductive colloidal silica binder, with a pair of spaced electrodes or busbars secured to the film. Such heating elements are described in U.S. Pat. No. 3,179,544, which is incorporated herein by this reference.

An advantage of these preferred heating elements is that they can be subjected to high temperatures without degradation. This is because the electrically insulating material can be asbestos, and because colloidal silica binders can withstand high temperatures. In fact, as noted in U.S. Pat. No. 3,179,544, during the manufacture of these preferred heating elements, they are heated to 350° F.

Another advantage of using a heating element as described in U.S. Pat. No. 3,179,544 is that it is flexible, and thus can easily be shaped to conform to the configuration of the housing. A further advantage is that even if water leaks into the housing and the heating element becomes wet, the resistance of this type of heating element does not decrease, but instead increases by no more than about 20%. Therefore, the heating element does not short out. When the heater 10 is activated, the heating element can revert to normal operation by driving off the water and drying out.

A further advantage of using the heating elements of U.S. Pat. No. 3,179,544 is that the current flows between the electrodes in a path perpendicular to the longitudinal axis of the electrodes. Therefore, there is an infinite number of parallel flow paths, so that even if a portion of the heating element becomes damaged, the heating element can continue to operate.

Heating elements described in U.S. Pat. No. 3,179,544 are commercially available from Raychem Corporation under the trademark CelloTherm TM. CelloTherm TM heating elements comprise graphite as the conductive material and asbestos as the electrical insulating material. They can easily be connected to the thermostat 16 by strapling each busbar of the heater to one of the metal strips of the thermostat or to connecting leads.

As noted earlier, the housing needs to provide a large heat transfer surface area because of the low energy density of the distributed heating element. Shapes that are suitable for the housing include cylindrical, spherical, cubical, oval in cross section, and rectangular in cross section. A preferred shape is rectangular in cross section because it maximizes the surface area to volume ratio of the housing. Another advantage of a rectangular shape is that is matches the generally rectangular shape of the aquarium. A preferred housing is shown in FIG. 2. Another preferred housing is oval in cross-section, as shown in FIG. 5. Housings oval in cross section exhibit less stress cracking than housings rectangular in cross-section, which are subject to such cracking at the corners.

As shown in FIG. 2, the water-impermeable housing 32 concludes an upper, open portion 40 to which the cap 30 is secured and a hollow, thin, elongated, wedge-shaped heating section 42 for immersion in water in an aquarium.

The upper portion of the housing includes a depending flange 44 supporting a mounting screw 46 that is used to fasten the heater to an aquarium wall. The screw 46 presses against the outside wall of an aquarium while ribs 48 hold the heating section of the housing away from the inside wall of the aquarium.

As shown in FIG. 4, the heating section 42 comprises four substantially planar side walls, two opposing side walls 50 being substantially wider than the other two side walls 51. This shape provides a large surface area for heat transfer from the heating element to the medium to be heated, and has a high surface area to volume ratio. Due to the low energy densities of the distributed heating element 14, such a large surface area is required. For example, for a heating element having an energy output of 5 watts per square inch, 20 square inches of effective surface area are required to have a standard size 100 watt aquarium heater. For a conventional wire-wound heating element, the effective surface area typically is only about 6 inches or less.

For good thermal coupling between the heating element 14 and the housing, the heating element is maintained against the walls of the housing. This can be effected by many techniques, including (1) bonding the heating element to the housing by an adhesive such as an epoxy adhesive; (2) molding the heating element into the wall of the housing; (3) softening the housing by heat or solvents and embedding the heating element into the wall of the housing; (4) relying on the inherent "springiness" of a CelloTherm TM heating element by rolling the heating element into the shape of a cylinder and placing it inside a tubular housing; or (5) using a support member for holding the heating element in place.

The support member can be a heat expandable member such as a heat expandable core of memory plastic or memory metal that upon heating irreversibly expands to press the heating element against the walls of the housing. The heat for expansion can be provided by the heating element itself. The support member can also be a spring member. Preferably, the support member is the rigid support core 36 as shown in FIG. 2.

As shown in FIG. 2, the heating element 14 is bent into a narrow "U" so that it can be held by the support core 36 against the internal surface of each of the wider side walls 50. The bottom of the "U" is cut out, except for the conductors. If this were not done with CelloTherm TM heaters, then undesirable cracking could occur at the bend of the "U".

The support core 36 is wedge-shaped so that it conforms to the shape of the heating section of the housing. By making both the support 36 and the heating section 42 wedge-shaped, the support 36 can act to press the heating element 14 against the internal surface of the heating section for optimum heat transfer to the liquid medium surrounding the housing. The support 36 has a plurality of projections such as parallel, spaced apart ribs 54. The ribs are substantially parallel to the longitudinal axis of the heating section of the housing. Each of the wider surfaces of the core has these ribs 54. The heating element is wrapped around the core, i.e., the support core 36 sits within the "U".

The core 36 can be made of the same material that the housing 32 is made, such as polyphenylene sulfide. However, to minimize cost, the core can be made of less expensive material, such as polypropylene. Although polypropylene does not have the high melt temperature possessed by polyphenylene sulfide, softening, or even local melting, of the core does not result in a dangerous situation as does failure of the housing. Therefore, the core can be made of a less expensive, lower performance material than polyphenylene sulfide.

As shown in FIG. 4, there is a gap 58 in the ribs for mounting of the circuit protection device 12. The location at which the circuit protection device is mounted in relationship to the water level and the heating element is important to the proper operation of the heater 10. The circuit protection device needs to be located in a position where it can sense the temperature of the heating element. As shown in FIG. 2, it is desirable that the circuit protection device be proximate to both the top of the heating element and the normal water level. At this location, the circuit protection device is capable of tripping before the housing melts, but the circuit protection device experiences minimal nuisance tripping.

It is desirable that the walls of the heating section of the housing be as thin as possible for fast and efficient transfer of heat to aquarium water. Therefore, preferably the walls are no more than about 0.2 inch thick. However, if the walls are made too thin, pin holes can result during the molding operation, providing a water leakage path through the housing, and the housing may not have adequate strength to pass the UL crushing test. Therefore, preferably the walls are at least about 0.05 inch thick. Optimally, the walls are about 0.1 inch thick.

The heater described herein has many substantial advantages compared to prior art heaters. Not only does it satisfactorily heat water as does a conventional "test tube" aquarium heater, but it is also resistant to mechanical and operational abuse. The housing resists cracking in situations where glass would normally crack. In addition, the housing, even when hot, does not crack when immersed in cold water. Furthermore, because of the distributed heating element 14 and the temperature limiting means, the housing is protected from melting. Because the heating element is pressed firmly against the housing by a ribbed support core 36, efficient heat transfer to water can be obtained. An aquarium heater according to the present invention satisfies the requirements of Underwriter Laboratories standard 1018, something no known commercially available heater can accomplish.

Although the present invention has been described in considerable detail with reference to certain preferred versions thereof, other versions are possible. For example, instead of one heating element 14, two heating elements in parallel or series can be used. Furthermore, two or more temperature limiting means can be used. Therefore, the spirit and scope of the appended claims should not necessarily be limited to the description of the preferred versions contained herein.

What is claimed is:

1. A method for heating a liquid comprising the steps of (1) placing in the liquid a heating article comprising (a) a water-impermeable, heat conductive housing fabricated from a meltable material having a notched Izod impact strength of at least about 0.5 ft-lbs/in. and (b) a flexible heating element within the housing and in intimate engagement with the housing, the flexible heating element being capable of providing from about 1 to about 10 watts per square inch of surface area of the heating element; and (2) connecting the heating article to a source of electric power so that heat is transferred from the heating element through the housing to the liquid.

2. The method of claim 1 in which the article includes temperature limiting means capable of preventing the heating element from raising the temperature of the housing to a temperature at which it softens or melts.

3. The method of claim 2 in which the temperature limiting means is a circuit protection element comprising at least two electrodes and a PTC element composed of a PTC composition.

4. The method of claim 2 in which the heating element comprises a PTC composition that serves as the temperature limiting means.

5. The method of claim 1 including a temperature control device for regulating the heating element for controlling the temperature of the liquid.

6. The method of claim 1 in which the heating element comprises an electrically conductive film sandwiched between two sheets of electrically insulating material, the electrically conductive film consisting of a conductive material dispersed throughout a non-conductive colloidal silica binder, with spaced electrodes applied to the film.

7. The method of claim 6 in which the conductive material comprises graphite.

8. The method of claim 6 or 7 in which at least one sheet of electrically insulating material comprises asbestos.

9. The method of claim 1 in which the heating element is sufficiently flexible to conform to the shape of the housing.

10. A method for heating a liquid comprising the steps of:
   (1) placing in the liquid a heating article comprising:
      (a) a water-impermeable, heat conductive housing;
      (b) within the housing, a heating element sufficiently flexible to conform to the shape of the housing and capable of providing from about 1 to about 10 watts per square inch of surface area of the heating element; and
      (c) coupling means for maintaining the heating element thermally coupled to and in intimate engagement with the interior of the housing; and
   (2) connecting the heating article to a source of electrical power so that heat is transmitted from the heating element through the housing to the liquid.

11. The method of claim 10 in which the coupling means comprises a support member that maintains the heating element in intimate engagement with the interior of the housing.

12. The method of claim 10 in which the housing is composed of a material having a notched Izod impact strength of at least about 0.5 ft-lbs/in.

13. The method of claim 10 or 12 in which the housing is composed of a material having a heat transfer coefficient of at least about 2 BTU-inches per hour-square foot-°F.

14. The method of claim 10 in which the housing is composed of a material having a heat distortion temperature at 264 psi of at least about 350° F.

15. A method for heating a liquid comprising the steps of:
   (1) placing in the liquid a heating article comprising:
      (a) a water impermeable, heat conduction housing fabricated from a meltable material having a notched Izod impact strength of at least about 0.5 ft-lbs/in.;

(b) within the housing, a flexible heating element capable of providing from about 1 to about 10 watts per square inch of surface area of the heating element; and (c) a circuit protection element comprising at least two electrodes and a PTC element composed of a PTC composition for preventing the heating element from raising the temperature of the housing to a temperature at which it softens or melts; and (2) connecting the heating article to a source of electrical power so that heat is transferred from the heating element through the housing to the liquid.

16. The method of claim 1 or 15 in which the housing is composed of a material having a heat transfer coefficient of at least about 2 BTU-inches per hour-square foot-°F.

17. The method of claim 1 or 15 in which the housing is composed of a material having a heat distortion temperature at 264 psi of at least about 350° F.

18. The method of claim 1, 10 or 15 in which the heating element is capable of providing at least about 3 watts per square inch of surface area.

19. The method of claim 1, 10 or 15 in which the heating element is capable of providing no more than about 7 watts per square inch of surface area.

20. The method of claim 15 in which the housing is composed of a material having a heat transfer coefficient of at least about 2 BTU-inches per hour-square foot-°F.

21. The method of claim 15 in which the housing is composed of a material having a heat distortion temperature at 264 psi of at least about 350° F.

22. A method for heating a liquid comprising the steps of:

(1) placing in the liquid a heater comprising:

(a) a water-impermeable, heat conductive, electrically insulating, closed housing comprising a hollow heating section for immersion in water, walls of the heating section having a notched Izod impact strength of at least about 0.5 ft-lbs/in. and a heat distortion temperature at 264 psi of at least about 350° F.;

(b) a distributed heating element within the heating section of the housing, the heating element being capable of providing from about 1 to about 10 watts per square inch of surface area and being sufficiently flexible to conform to the interior surface of the heating section;

(c) coupling means for maintaining the heating element thermally coupled with the internal surface of the heating section walls; and (d) temperature limiting means for preventing the heating element from heating the housing to a temperature at which the housing melts or softens; and (2) connecting the heater to a source of electrical power so that heat is transferred from the heating element through the housing to the liquid.

23. The method of claim 22 in which the walls of the heating section have a heat transfer coefficient of at least about 2 BTU-inches per hour-square foot-°F.

24. The method of claim 22 in which the temperature limiting means is a circuit protection element comprising at least two electrodes and a PTC element composed of a PTC composition.

25. The method of claim 22 in which the heating element comprises a PTC composition that serves as the temperature limiting means.

26. The method of claim 22 in which the coupling means comprises a support member that maintains the heating element in intimate engagement with heating section walls.

27. A method for heating water in an aquarium comprising the steps of:

(1) placing in the water in the aquarium an aquarium heater comprising:

(a) a water-impermeable, heat-conductive, electrically insulating, closed housing comprising a hollow, thin, elongated, wedge-shaped heating section for immersion in water in an aquarium, the heating section walls having a heat transfer coefficient of at least about 2 BTU-inches per hour-square foot-°F., a notched Izod impact strength of at least about 0.5 ft-lbs/in., and a heat distortion temperature at 264 psi of at least about 350° F.;

(b) a flexible, distributed heating element within the heating section of the housing, the heating element being insulated from the water and being capable of providing from about 3 to about 7 watts per square inch of surface area;

(c) a wedge-shaped support for maintaining the heating element in intimate engagement with the internal surface of both of the wider side walls; and (d) a circuit protection element comprising at least two electrodes and a PTC element composed of a PTC composition, the temperature limiting device being selectively located in the heating section of the housing for preventing the heating element from heating the housing to a temperature at which the housing melts or softens; and (2) connecting the heater to a source of electrical power so that heat is transferred from the heating element through the housing to the water.

28. The method of claim 27 in which the walls of the heating section are from about 0.05 to 0.2 inch thick.

29. The method of claim 27 in which the housing is composed of polyphenylene sulfide.

30. The method of claim 27 in which the heating element is capable of providing about 5 watts per square inch of surface area.

31. The method of claim 27 in which the heating element comprises an electrically conductive film sandwiched between two sheets of electrically insulating material, the electrically conductive film consisting of a conductive material dispersed throughout a non-conductive colloidal silica binder, with spaced electrodes applied to the film.

32. The method of claim 27 in which the wedge-shaped support comprises a body member having a plurality of projections that support the heating element.

33. The method of claim 32 in which the projections are parallel, spaced apart ribs, the ribs being substantially parallel to the longitudinal axis of the heating section of the housing.

34. The method of claim 32 or 33 in which the heater includes a gap in the projections for mounting of the PTC element.

35. The method of claim 27 in which the heating section comprises four substantially planar side walls, two opposing side walls being substantially wider than the other side walls.

36. The method of claim 27 in which the heating section is oval in cross-section.

37. The method of claim 18 in which the heating element is capable of providing no more than about 7 watts per square inch of surface area.

38. The method of claim 37 in which the heating element is capable of providing at least 3 but no more than 7 watts per square inch of surface area.

39. A method for heating a liquid comprising the steps of:
(1) placing in the liquid a heating article comprising:
 (a) a water-impermeable, electrically insulating housing comprising a hollow heating section for immersion in the liquid, the walls of the heating section being from 0.05 to 0.2 inches thick and being composed of a material having a notched Izod impact strength of at least 0.5 ft-lbs/in., a heat distortion temperature at 264 psi of at least 350° F., and a thermal conductivity of at least 2 BTU-inches per hour-square foot-°F.;
 (b) a flexible distributed heating element within the heating section of the housing, the heating element being capable of providing from about 1 to about 10 watts per square inch of surface area and conforming to the interior surface of the heating section;
 (c) a support member for maintaining the heating element in contact with the internal surface of the heating section walls; and
 (d) an adjustable thermostat for regulating the heating element; and
(2) connecting the heating article to a source of electrical power.

40. The method of claim 39 wherein the article comprises a circuit protection device which comprises a PTC element composed of a PTC composition, and which in the event of failure of said adjustable thermostat, prevents the heating element from heating the housing to a temperature above the material's melting point.

41. The method of claim 39 wherein the heating element is a self-limiting heater comprising a PTC composition.

42. The method of claim 40 wherein the support member is a rigid support core comprising a body member and a plurality of parallel, spaced-apart ribs projecting from said body member, the ribs being substantially parallel to the longitudinal axis of the heating section of the housing and maintaining the heating element in contact with the internal surface of the heating section walls, and said circuit protection device is mounted in a gap between said ribs.

* * * * *